United States Patent [19]
King

[11] Patent Number: 5,257,886
[45] Date of Patent: Nov. 2, 1993

[54] COOLANT DISTRIBUTION SYSTEM FOR BLIND BROACHING

[75] Inventor: Carrol L. King, Shelby Township, Macomb County, Mich.

[73] Assignee: National Broach & Machine Company, Mt. Clemens, Mich.

[21] Appl. No.: 5,834

[22] Filed: Jan. 19, 1993

[51] Int. Cl.$^5$ ............................................. B23D 37/00
[52] U.S. Cl. .................................................... 409/249
[58] Field of Search ....................... 409/249, 244, 243; 407/11

[56] References Cited

U.S. PATENT DOCUMENTS 4,573,841  3/1986  Petkov et al. ........................ 409/244

FOREIGN PATENT DOCUMENTS 818775  4/1981  U.S.S.R. ............................... 409/243
917973  4/1982  U.S.S.R. ............................... 409/249
1093439  5/1984  U.S.S.R. ............................... 409/243

Primary Examiner—William Briggs
Attorney, Agent, or Firm—Barnes, Kisselle, Raisch, Choate, Whittemore & Hulbert

[57] ABSTRACT

A coolant distribution system in which coolant is introduced through the workholder in a broaching operation to lubricate the surfaces where the workpiece is in contact with the broach, to dissipate heat generated by the broaching action and to flush away chips. The workholder is an elongated arbor having a chuck for gripping the workpiece. A fluid passage for coolant extends through the arbor and has a first set of outlets for emitting coolant adjacent to the workpiece and a second set of outlets for emitting coolant through a pilot on the end of the arbor. The second set of outlets when the pilot enters a guide as it approaches the broach, causing an increased volume of coolant to flow from the first set of outlets.

16 Claims, 6 Drawing Sheets

COOLANT DISTRIBUTION SYSTEM FOR BLIND BROACHING

This invention relates generally to broaching, and refers more particularly to a coolant distribution system for blind broaching.

BACKGROUND AND SUMMARY

In general, parts being machined or broached will have coolant applied to the contacting surfaces of the work and the cutting tool for the purpose of dissipating heat generated by the cutting action and also to flush away chips produced by the cutting action. The coolant is sometimes distributed through the cutting tool.

In accordance with the present invention, the coolant is introduced through the workholder and is employed in a broaching operation to lubricate the surfaces where the workpiece is in contact with the broach, to dissipate heat generated by the broaching action and to flush away chips produced by the broaching action.

In the embodiment of the invention which will be described, the workholder has a chuck on which the workpiece is mounted. A guide is provided to receive a pilot on the workholder during the final stages of movement of the broach and workholder toward each other. A fluid passage in the workholder has a first series of outlets for emitting coolant adjacent to the workpiece, and a second series of outlets in the pilot also for emitting coolant. The guide closes the second series of outlets when the pilot enters the guide, causing an increased volume of coolant to be emitted from the first series of outlets onto the surfaces where the workpiece is in contact with the broach. The coolant distribution system of this invention can be used for both internal and external broaching.

One object of this invention is to provide a coolant distribution system having the foregoing features.

Another object is to provide a coolant distribution system which is composed of a relatively few simple parts, is dependable and reliable in operation, is rugged and durable in use, and is relatively easy to manufacture and assemble.

Other objects, features and advantages of the invention will become more apparent as the following description proceeds, especially when considered with the accompanying drawings.

DETAILED DESCRIPTION

Figure 1:
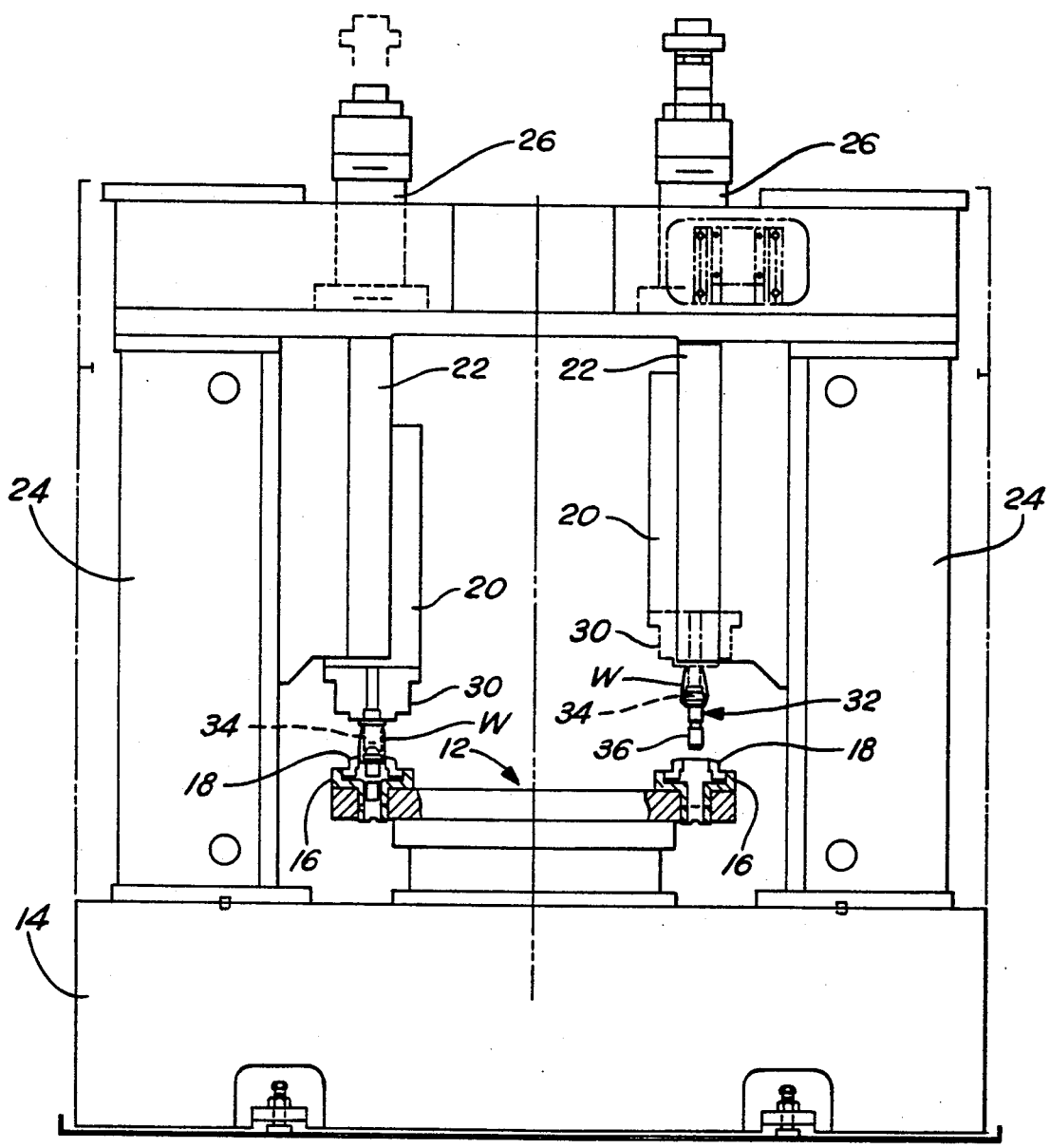
FIG. 1 is elevational view of a machine for external broaching, having a coolant distribution system according to the invention.

Referring now more particularly to the drawings, and especially to FIGS. 1-4, a rotatable indexing table 12 mounted on a machine base 14 is provided with angularly spaced broach holders 16 mounted equal distances from the center axis of table rotation. Broaches 18 are mounted on the holders 16.

Rams 20 above the table in positions over the circle on which the broach holders are mounted, are moved vertically in guides 22 on the machine frame 24 by piston-cylinder assemblies 26. The table is indexed step-by-step to align the broaches with workpieces W carried by the rams. Workpieces W are broached as the rams move up and down after each indexing of the table. Any suitable power means may be employed to rotate the table.

A workpiece clamping fixture 30 is mounted on the lower end of each ram. Each fixture carries a workholder 32 in a center bore in the fixture. The workholder 32 is in the form of an elongated vertical arbor having an intermediate chuck 34 and a cylindrical pilot 36 on the lower end extending downwardly from the chuck. The pilot is formed with angularly spaced vertical slots or grooves 40. The chuck is of any suitable construction and is shown as having radial jaws 42 adapted to be projected radially outwardly to clamp on the inner diameter of a workpiece which in this instance is a tubular shell W.

The broach 18 is an annular member having internal cutting teeth 44 for cutting splines on the outer diameter of the shell W. The broach holder 16 is an annular member concentric with broach 18 and has a vertical cylindrical bushing 45 forming a guide adapted to closely receive the pilot 36 on the end of the arbor.

The coolant distributing system includes a passage 46 in the ram which may be attached to a suitable source of coolant under pressure (not shown) by a fitting 48. The passage 46 leads to a chamber 50 defined between the confronting surfaces of the ram 20 and workpiece clamping fixture 30. The arbor 32 has a central through passage 52 leading from the chamber 50 to the bottom of the pilot where it is sealed by a plug 54. The passage 52 in the arbor connects with angularly spaced, radially outwardly extending exit holes which terminate in outlets 56 at the bottom of the chuck adjacent the lower end of the shell carried by the chuck. Near its lower end, the passage 52 is in communication with angularly spaced, radially outwardly extending and downwardly sloping exit holes in the arbor 32 which terminate in outlets 58 located between slots 40.

Figure 2:
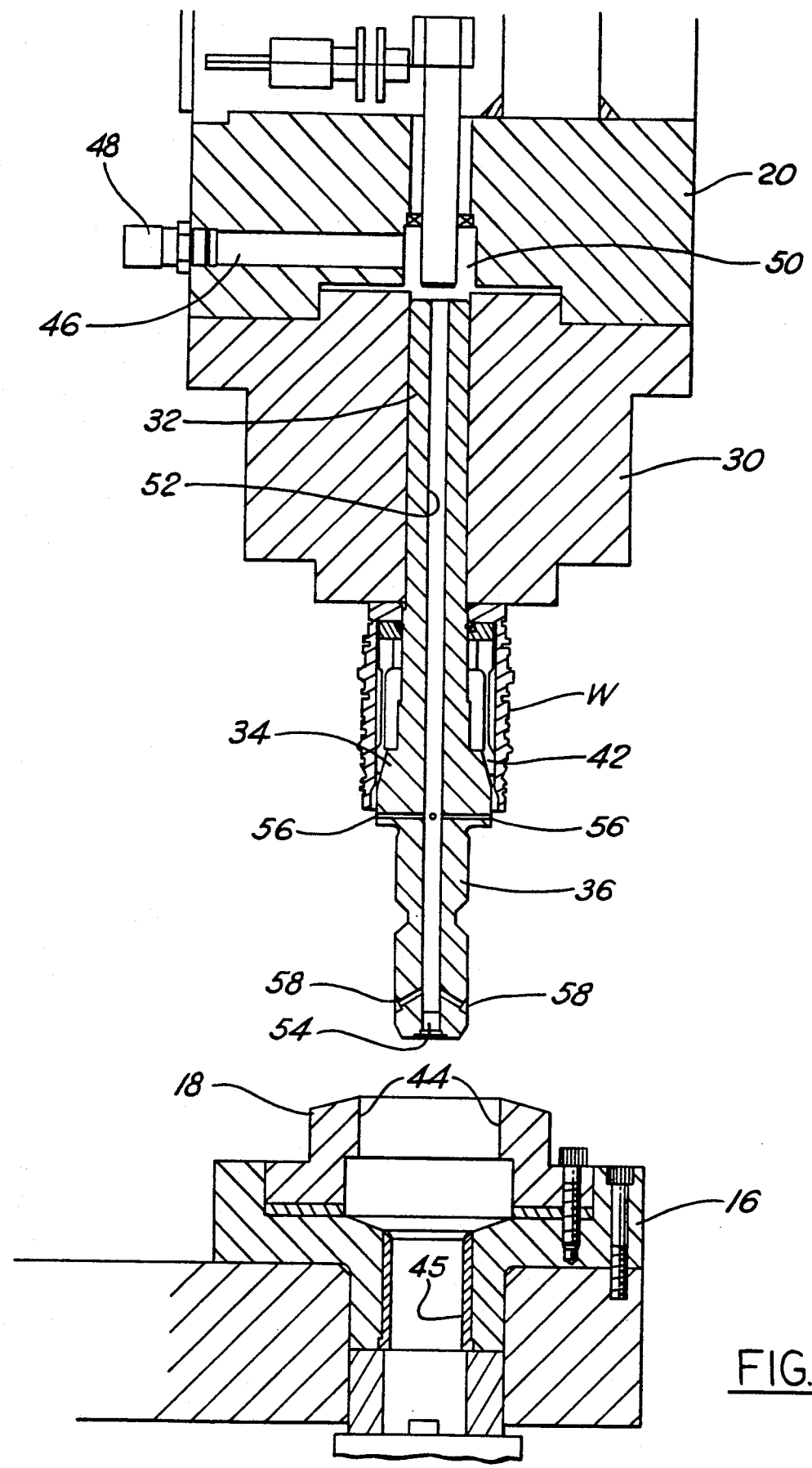
FIG. 2 is an enlarged sectional view of a portion of FIG. 1, showing the workholder and ram on which it is mounted in an elevated with respect to a broach.

FIG. 2 shows the ram at the upper limit of its movement in which the arbor 32 and shell W are elevated clear of the broach. Coolant will be seen exiting from both the upper outlets 56 and the lower outlets 58. This coolant flows continuously down over the broach.

Figure 3:
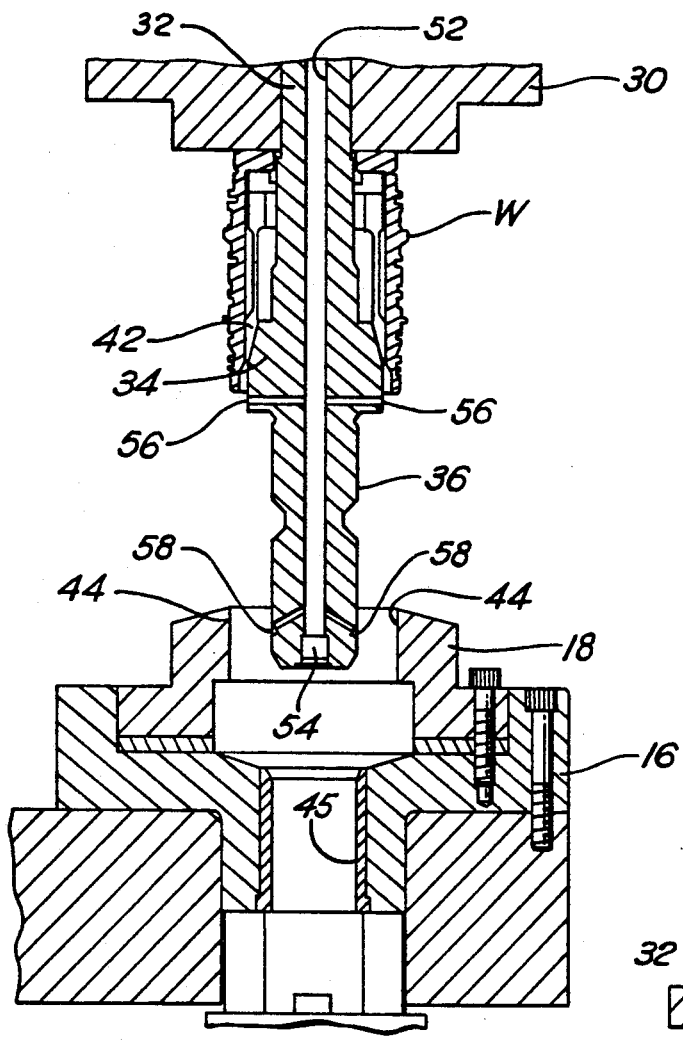
FIG. 3 is similar to FIG. 2, but shows the ram in its initial movement toward the broach with the pilot entering the broach.

FIG. 3 shows the ram in an intermediate position in which the pilot 36 on the end of the arbor enters the broach. Coolant exiting from the lower series of outlets 58 washes, lubricates and cools the inner cutting edges of the broach and clears any chips that may be present on the cutting surfaces. Coolant also flows over the broach from outlets 56.

Figure 4:
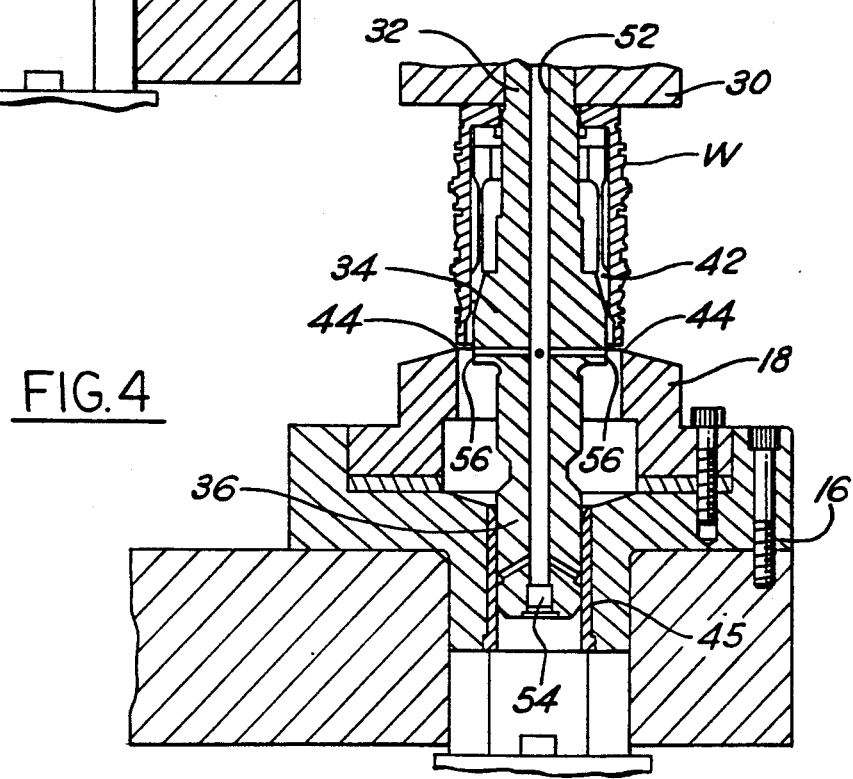
FIG. 4 is similar to FIGS. 2 and 3, but shows the ram in a later stage in its movement, in which the pilot on the workholder enters the pilot guide.

FIG. 4 shows the ram at a lower level in which the pilot has entered the bushing or guide 45. The wall of the bushing closes the outlets 58 so that an increased volume of coolant exits outlets 56. In this position of the ram, jets of coolant are sprayed by outlets 56 directly upon the cutting surfaces of the broach under increased pressure.

Figure 5:
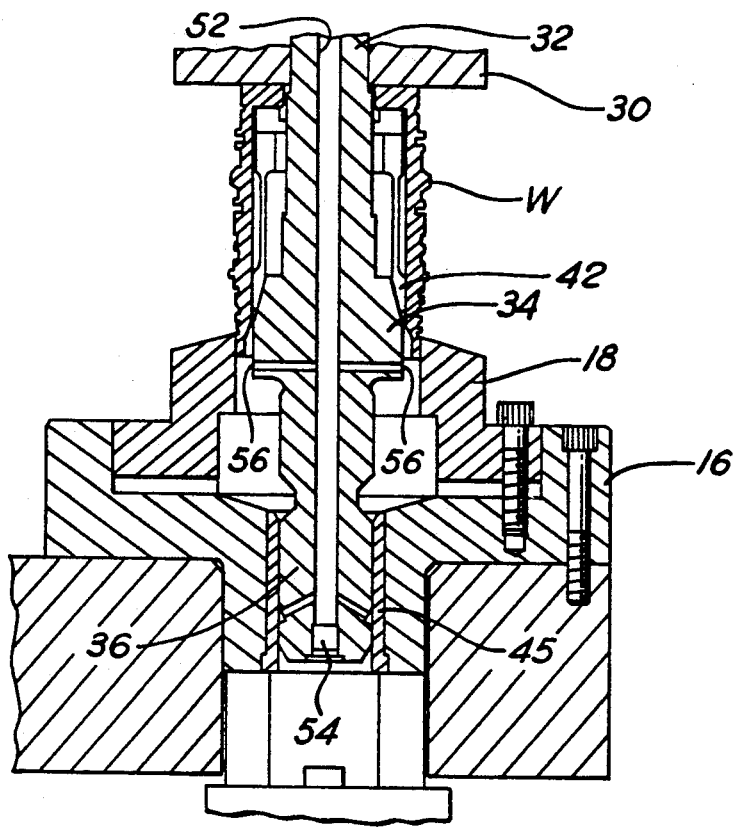
FIG. 5 is similar to FIGS. 2-4, but shows the ram at the bottom of its stroke with the external surface of the workpiece engaged by the cutting elements of the broach.
Figure 9:
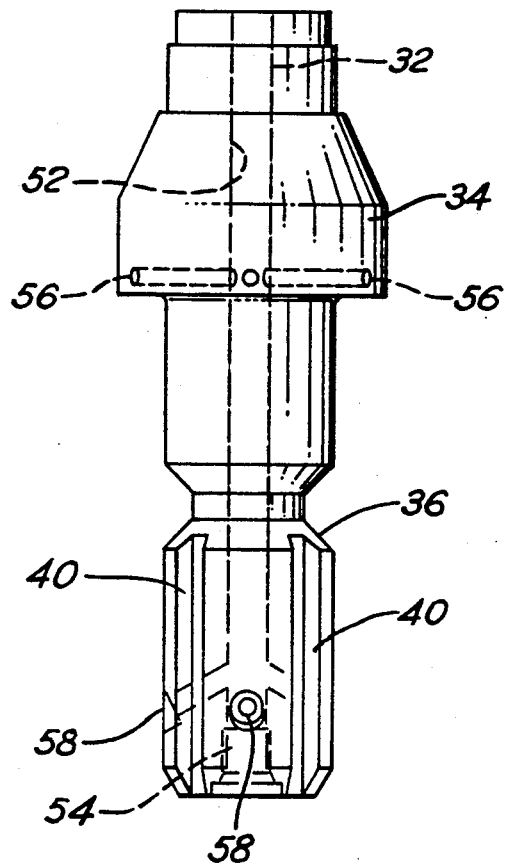
FIG. 9 is an enlarged view of the guide on the end of the workholder.

FIG. 5 shows the ram at its lower limit of travel where the broach completes its cutting action on the internal diameter of the shell. Coolant from outlets 56 is sprayed on the broach and also splashes on the shell during the cutting action.

The holes leading to outlets 56 are preferably of smaller cross-section than the holes leading to outlets 58 and their total cross-sectional area is less than that of the holes for outlets 58 in order to increase the force of the jets of coolant exiting outlets 56, especially when outlets 58 are closed. The grooves 40 in the pilot 36 drain any coolant which collects in the space 60 within the broach and the broach holder when the pilot is in the guide 45 as shown in FIGS. 4 and 5.

FIGS. 6–10 show a modification for internal broaching. The ram 20 and workpiece clamping fixture 30 are the same as in the first embodiment and are identified by the same references. The arbor 62 is similar to arbor 32 and has a chuck 64 like chuck 34 with jaws for clamping on the inner diameter of shell W'. The arbor 32 has the central through passage 65 leading from chamber 50 down to the plug 66 at the bottom. The radial holes from passage 65 lead the outlets 70 beneath the chuck and spray directly upon the inner surface 71 of the shell W' which is to be broached.

The radially outwardly extending and downwardly sloping holes from passage 65 lead to outlets 72 in the pilot 74 at the lower end of the arbor beneath the chuck. The pilot has a close sliding fit in the bushing or guide 76 disposed vertically within the broach holder 80 which is an annular member like the broach holder previously described. The broach 82 mounted on the broach holder is an annular member but has cutting teeth 83 on its outer periphery for forming splines on the inside diameter of the skirt 84 at the lower end of the shell W'.

A sleeve 86 secured to the bottom of the clamping fixture 30 surrounds the shell W'. A passage 88 extends from passage 46 in the ram down through clamping fixture 30 to the annular groove 90 in the top of sleeve 86 which is sealed by the bottom surface of the clamping fixture. Angularly spaced vertical passages 92 in the sleeve extend from groove 90 down to the outlets 94 which direct coolant radially inwardly at a point beneath the shell W'.

Figure 6:
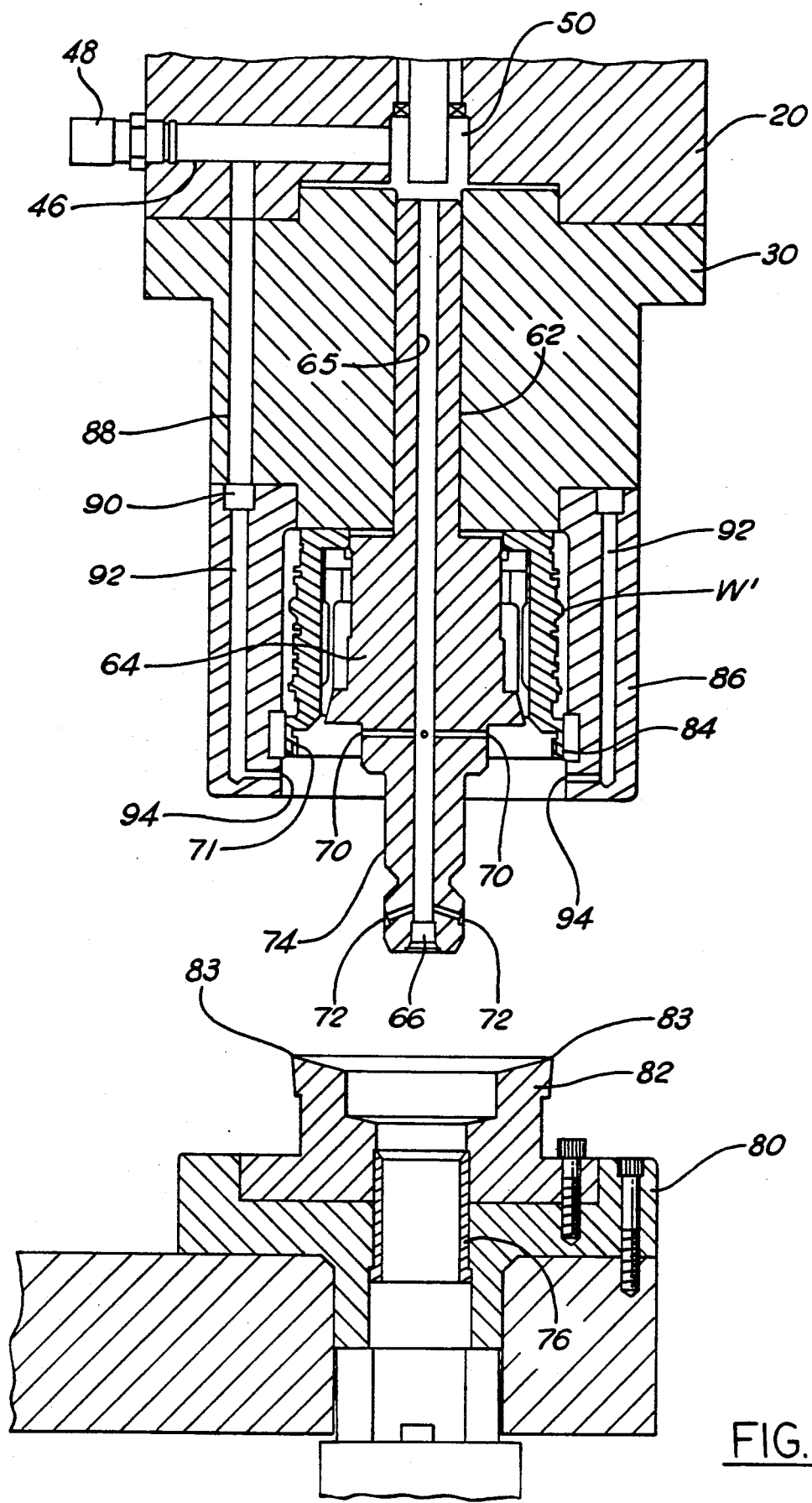
FIG. 6 is a view similar to FIG. 2, but shows a modification for use in internal broaching.

FIG. 6 shows the ram at the upper limit of its movement in which the arbor 62 and shell W' are elevated clear of the broach. Coolant exits from both the upper outlets 70 and the lower outlets 72 and outlets 94 and flows continuously down over the broach.

Figure 7:
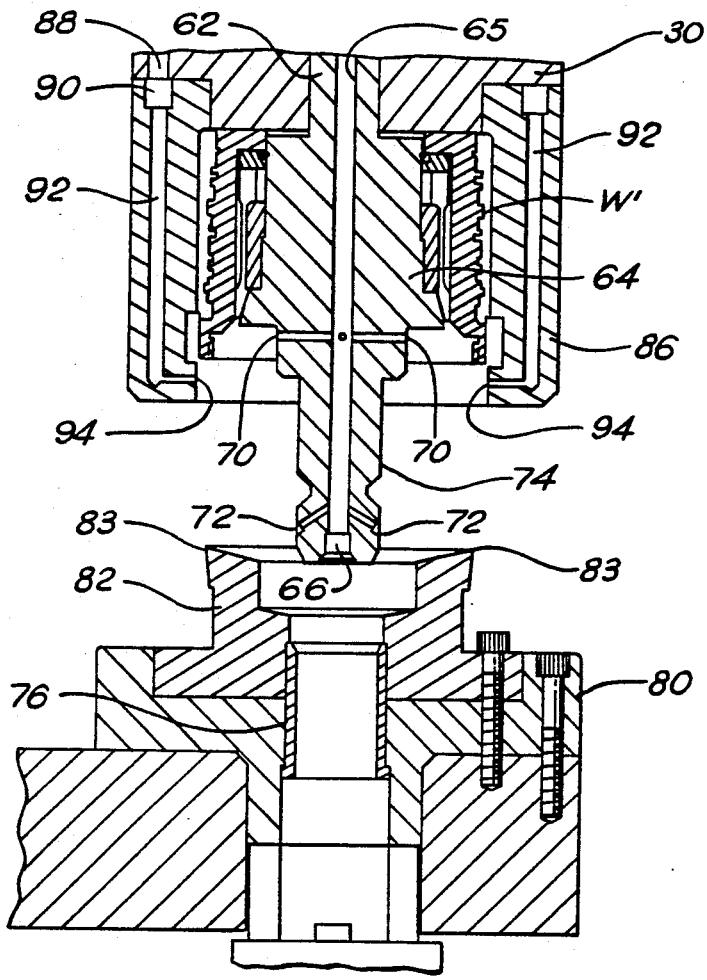
FIG. 7 is a view similar to FIG. 6, but shows the ram in an intermediate position during its movement towards the broach, with the pilot beginning its entry into the broach.

FIG. 7 shows the ram in an intermediate position in which the pilot begins to enter the broach and coolant from the lower series of outlets 72 is being sprayed directly upon the cutting teeth around the outside of the broach. As in the first embodiment, the coolant washing over the broach, lubricates and cools the cutting edges of the broach and clears away any chips that may have accumulated. Coolant also flows down over the broach from the upper series of outlets 70 and from outlets 94.

Figure 8:
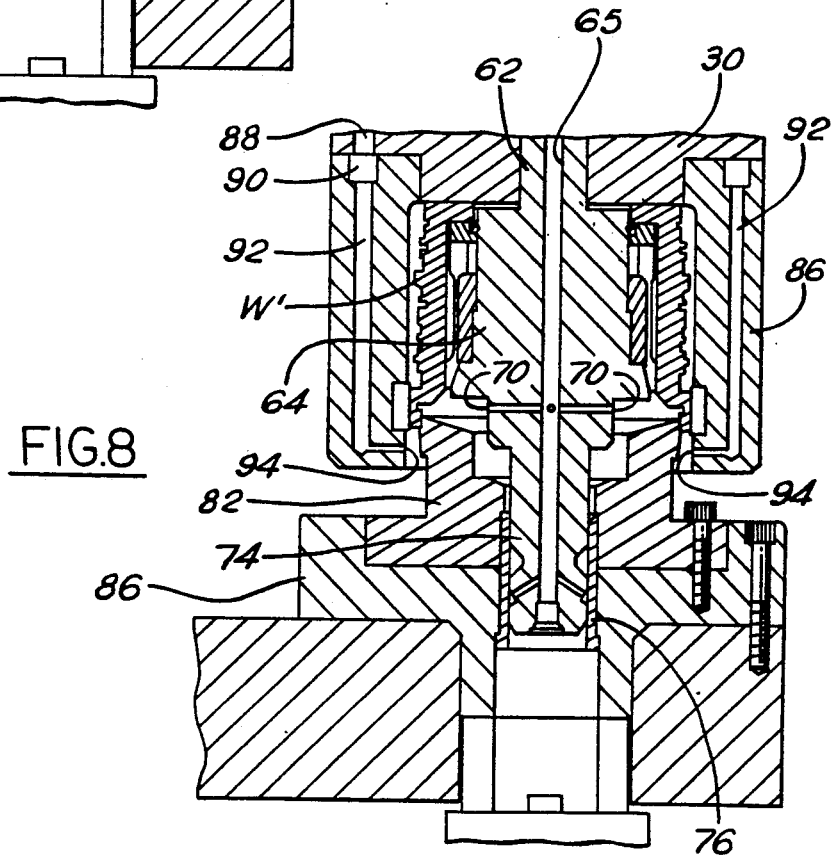
FIG. 8 is similar to FIGS. 6 and 7, but shows the ram near the bottom of its stroke, with the broach in contact with the work and the pivot in the guide.

FIG. 8 shows the ram at a lower level in which the pilot 74 has entered the bushing or guide 76. The wall of the bushing closes the outlets 72 so that an increased volume of coolant exits from the upper series of outlets 70. Jets of coolant are sprayed by outlets 70 directly upon the cutting surfaces of the broach under increased pressure. Coolant from outlets 94 spray directly on the cutting elements as the ram approaches the FIG. 8 position. The ram will continue to move downwardly a short distance from the FIG. 8 position in order to complete the cutting of splines on the inner surface of the skirt 84 at the bottom of the shell.

As in the first embodiment, the holes leading to outlets 70 are preferably of a smaller cross-section than the holes leading to outlets 72 and their total cross-sectional area is preferably less than that of the holes from outlets 70 so as to increase the force of the jets of coolant exiting outlets 70, especially when the lower outlets 72 are closed. The pilot 74 has grooves 90 for draining any coolant which may collect in the space within the broach and the broach holder when the pilot is in the guide or bushing 76.

What is claimed is:

1. A broaching machine comprising a broach, a workpiece holder having a chuck for clamping a workpiece, means for relatively moving said broach and workpiece holder toward and away from each other to broach a workpiece carried by said chuck, said workpiece holder having a pilot, means providing a pilot guide adapted to receive said pilot during relative movement of said broach and workpiece holder toward each other, and fluid passage means for coolant in said workpiece holder having first outlet means for emitting coolant adjacent a workpiece clamped by said chuck and second outlet means on said pilot for emitting coolant, said guide closing said second outlet means when said pilot enters said guide causing an increased volume of coolant to be emitted from said first outlet means.

2. A broaching machine according to claim 1, wherein said first and second outlet means are positioned and adapted to direct coolant onto said broach during the aforesaid relative movement of said broach and workholder toward each other.

3. A broaching machine according to claim 2, wherein said first and second outlet means each comprise a plurality of spaced outlets.

4. A broaching machine according to claim 3, wherein the outlets of said first outlet means are restricted relative to the outlets of said second outlet means.

5. A broaching machine according to claim 3, wherein the total cross sectional area of the outlets of said first outlet means is less than that of said second outlet means.

6. A broaching machine according to claim 3, wherein said outlets are arranged to emit coolant radially outwardly.

7. A broaching machine according to claim 6, and further including additional fluid passage means associated with said workpiece holder providing third outlet means having outlets arranged to emit coolant radially inwardly.

8. A broaching machine according to claim 3, wherein said broach has cutting elements adapted to externally broach a workpiece held by said chuck, said outlets emitting coolant radially inwardly to lubricate the contacting surfaces of the workpiece and the broach and to dissipate heat and flush away chips produced by broaching.

9. A broaching machine according to claim 8, wherein the outlets of said first outlet means are restricted relative to the outlets of said second outlet means.

10. A broaching machine according to claim 3, wherein said broach has cutting elements adapted to internally broach a workpiece held by said chuck, said outlets emitting coolant radially outwardly to lubricate the contacting surfaces of the workpiece and the broach and to dissipate heat and flush away chips produced by broaching.

11. A broaching machine according to claim 10, and further including additional fluid passage means associated with said workpiece holder providing third outlet means having outlets arranged to emit coolant radially inwardly.

12. A broaching machine according to claim 8, wherein the outlets of said first outlet means are restricted relative to the outlets of said second outlet means.

13. A broaching machine according to claim 3, wherein said workpiece holder is an elongated arbor with said pilot on the leading end of said chuck as said workpiece holder and broach move relatively toward each other.

14. A broaching machine according to claim 13, wherein said outlets are arranged to emit coolant radially outwardly.

15. A broaching machine according to claim 14, wherein said pilot has slots for the relief of coolant when said pilot is disposed in said guide.

16. A broaching machine according to claim 14, wherein the outlets of said first outlet means are restricted relative to the outlets of said second outlet means.

* * * * *